(12) United States Patent
Jurman

(10) Patent No.: US 9,873,244 B1
(45) Date of Patent: Jan. 23, 2018

(54) CLAMP AND METHOD OF USE

(71) Applicant: Gary Paul Jurman, Tampa, FL (US)

(72) Inventor: Gary Paul Jurman, Tampa, FL (US)

( * ) Notice: Subject to any disclaimer, the term of this patent is extended or adjusted under 35 U.S.C. 154(b) by 223 days.

(21) Appl. No.: 14/621,472

(22) Filed: Feb. 13, 2015

Related U.S. Application Data

(60) Provisional application No. 61/940,530, filed on Feb. 17, 2014.

(51) Int. Cl.
| | | |
|---|---|---|
| *B41F 15/36* | (2006.01) | |
| *B25B 1/08* | (2006.01) | |
| *B25B 1/24* | (2006.01) | |
| *F16M 11/04* | (2006.01) | |

(52) U.S. Cl.
CPC ............... *B41F 15/36* (2013.01); *B25B 1/08* (2013.01); *B25B 1/2489* (2013.01); *F16M 11/041* (2013.01)

(58) Field of Classification Search
CPC ...... B41F 15/36; A61G 13/00; A61G 13/0063
See application file for complete search history.

(56) References Cited

U.S. PATENT DOCUMENTS

| | | | | |
|---|---|---|---|---|
| 2,261,055 A * | 10/1941 | Dulaney | ............... | G04D 1/025 269/160 |
| 6,773,172 B1 * | 8/2004 | Johnson | ............... | F16M 11/041 248/187.1 |
| 7,003,827 B2 * | 2/2006 | DeMayo | ............... | A61G 13/10 248/229.14 |
| 7,004,067 B1 * | 2/2006 | Godsey | ............... | B41F 17/001 101/35 |
| 7,219,866 B2 * | 5/2007 | Depay | ............... | F16B 2/12 248/229.22 |
| 7,290,761 B2 * | 11/2007 | Siegel | ............... | B25B 1/08 269/266 |
| 7,380,299 B1 * | 6/2008 | DeMayo | ............... | F16M 11/045 5/618 |
| 7,686,267 B2 * | 3/2010 | DaSilva | ............... | A61B 17/02 248/228.5 |
| 2003/0025262 A1 * | 2/2003 | Kranzler | ............... | B25B 5/101 269/249 |
| 2005/0278851 A1 * | 12/2005 | DeMayo | ............... | A61G 13/10 5/624 |
| 2008/0203644 A1 * | 8/2008 | DaSilva | ............... | A61B 17/02 269/309 |

\* cited by examiner

*Primary Examiner* — Monica Carter
*Assistant Examiner* — Seahee Yoon
(74) *Attorney, Agent, or Firm* — Ted Masters

(57) ABSTRACT

A clamp includes a fixed jaw assembly which has a fixed jaw and a movable jaw assembly which has a movable jaw. The movable jaw assembly is movable with respect to said fixed jaw assembly so that the movable jaw moves with respect to the fixed jaw. A handle is rotatably connected to the fixed jaw assembly, the handle includes a cam which moves the movable jaw assembly. When the handle is placed in a first rotational position the jaws are open and the movable jaw is disposed a first distance from the fixed jaw. When the handle is placed in a second rotational position the jaws are closed and the movable jaw is disposed a second distance from the fixed jaw, the second distance being less than the first distance. An adjustment is provided for changing both the first and second distances.

8 Claims, 13 Drawing Sheets

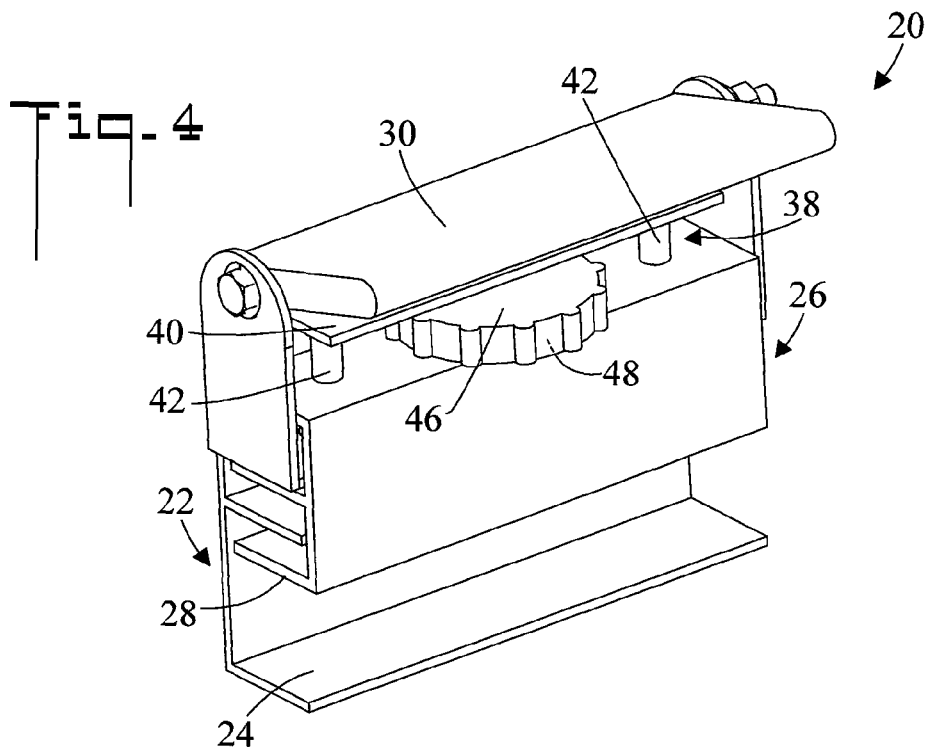
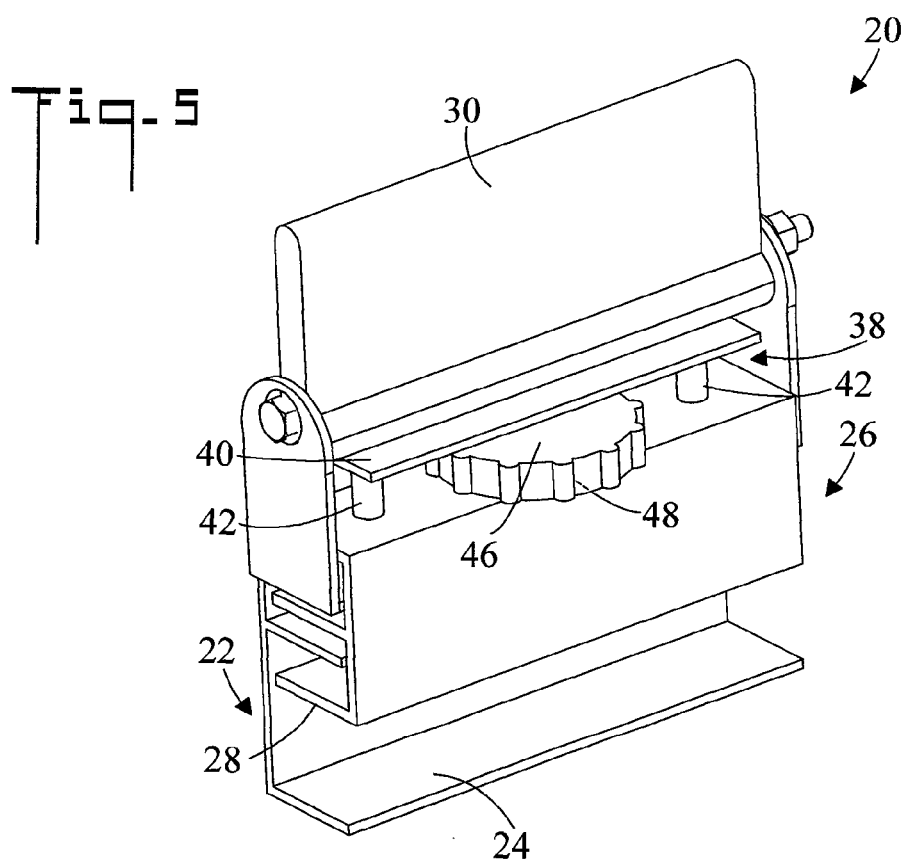

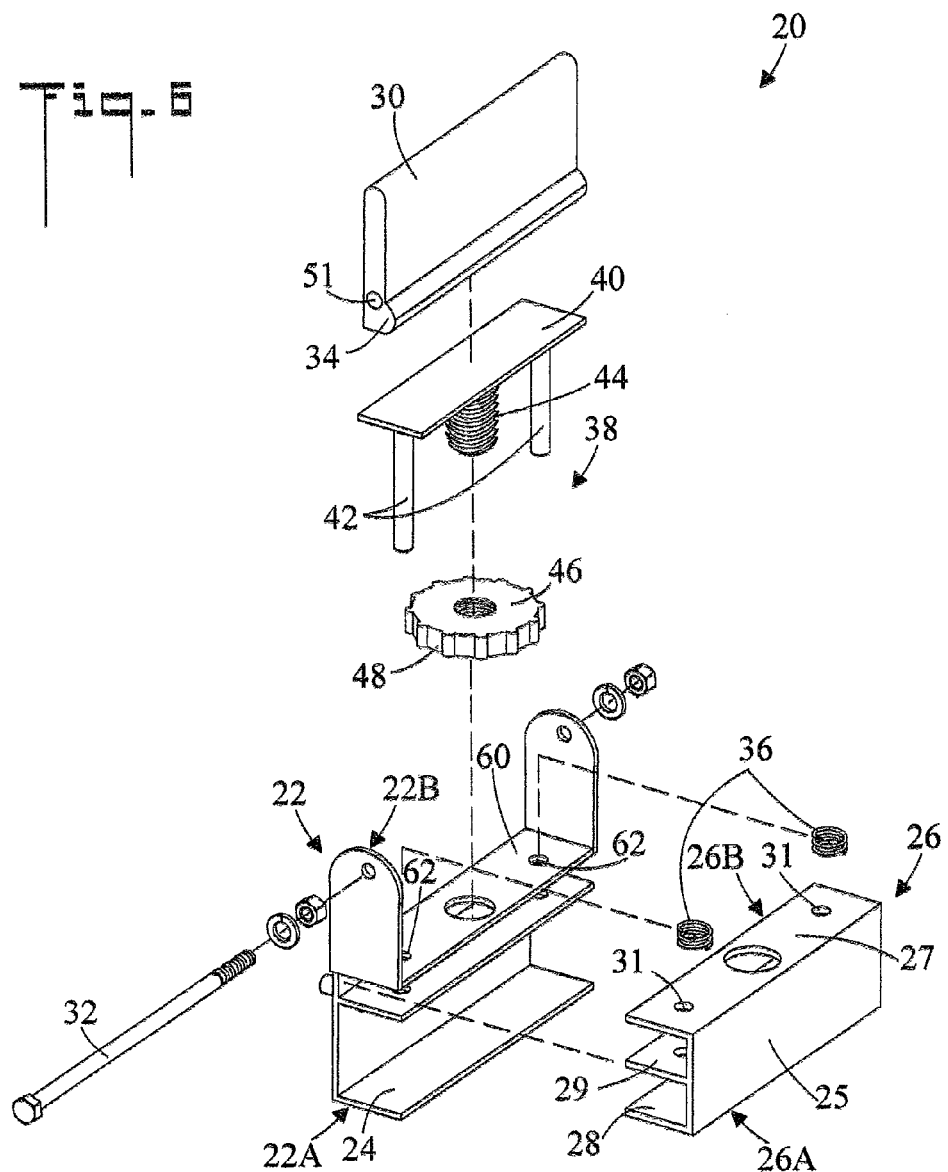

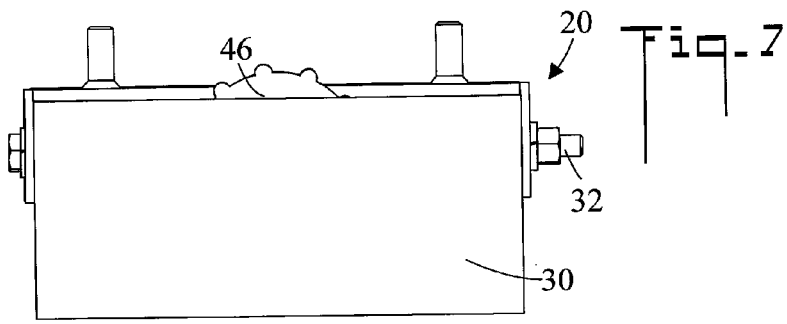
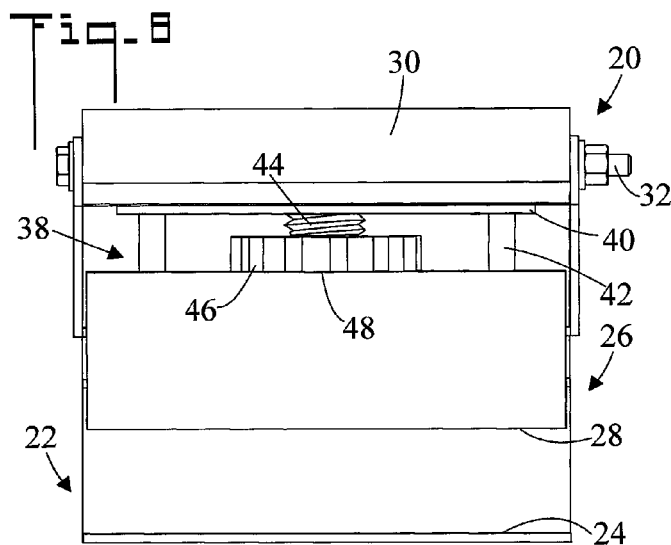
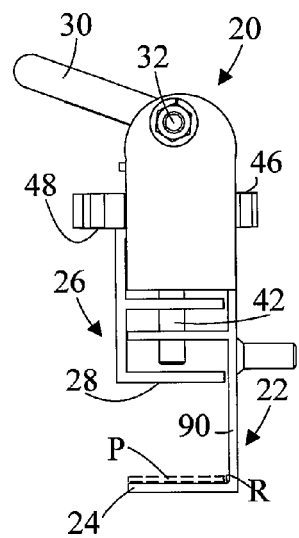
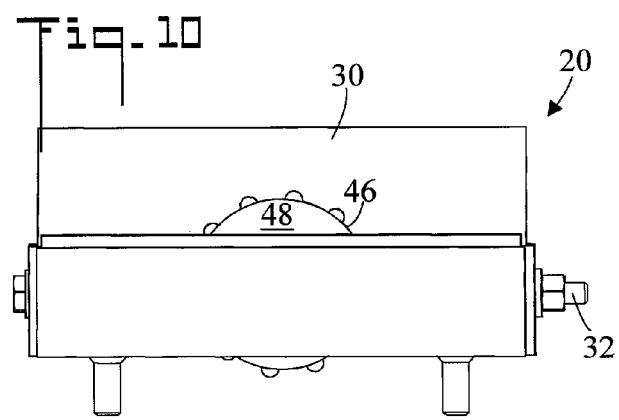

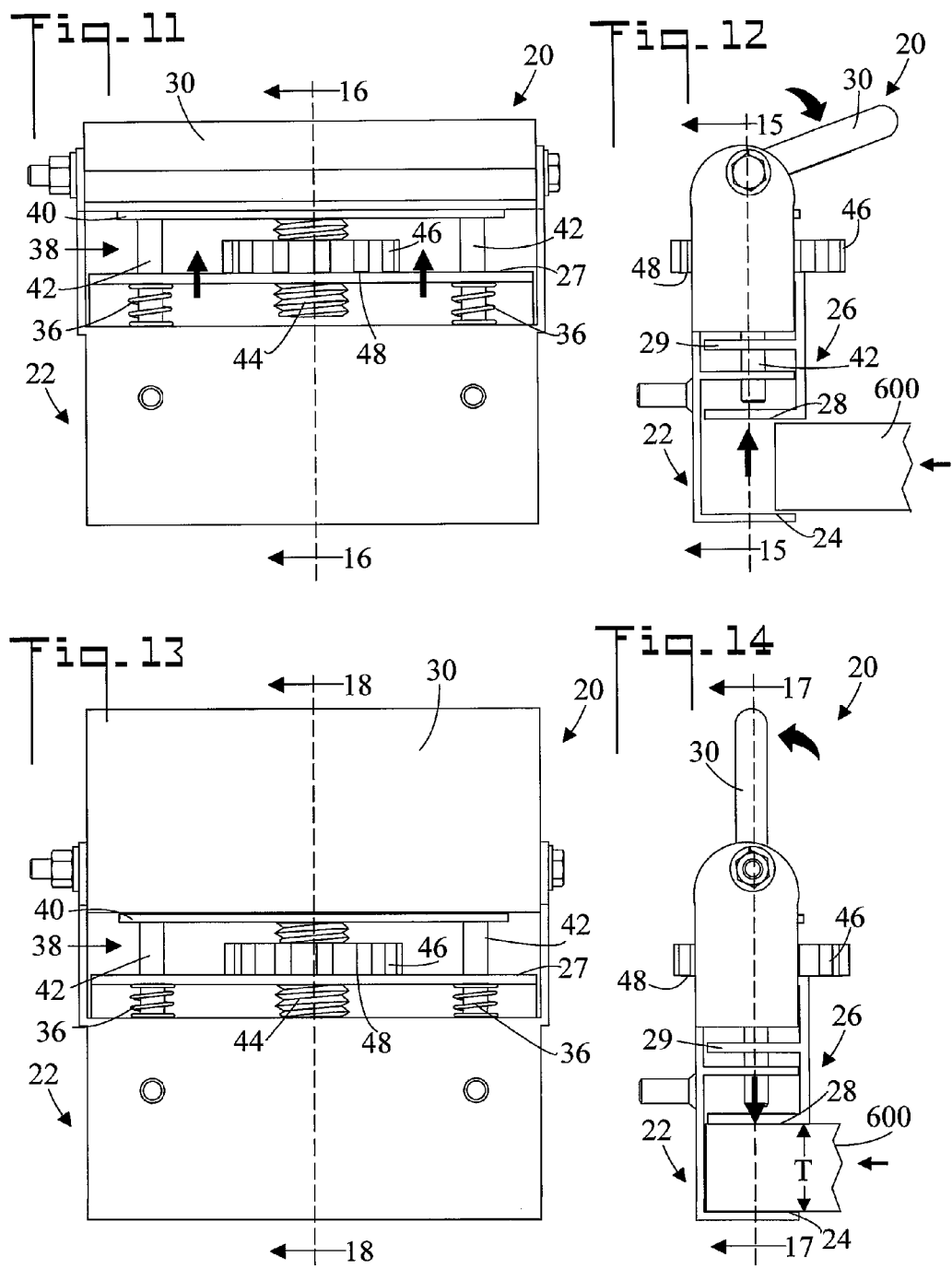

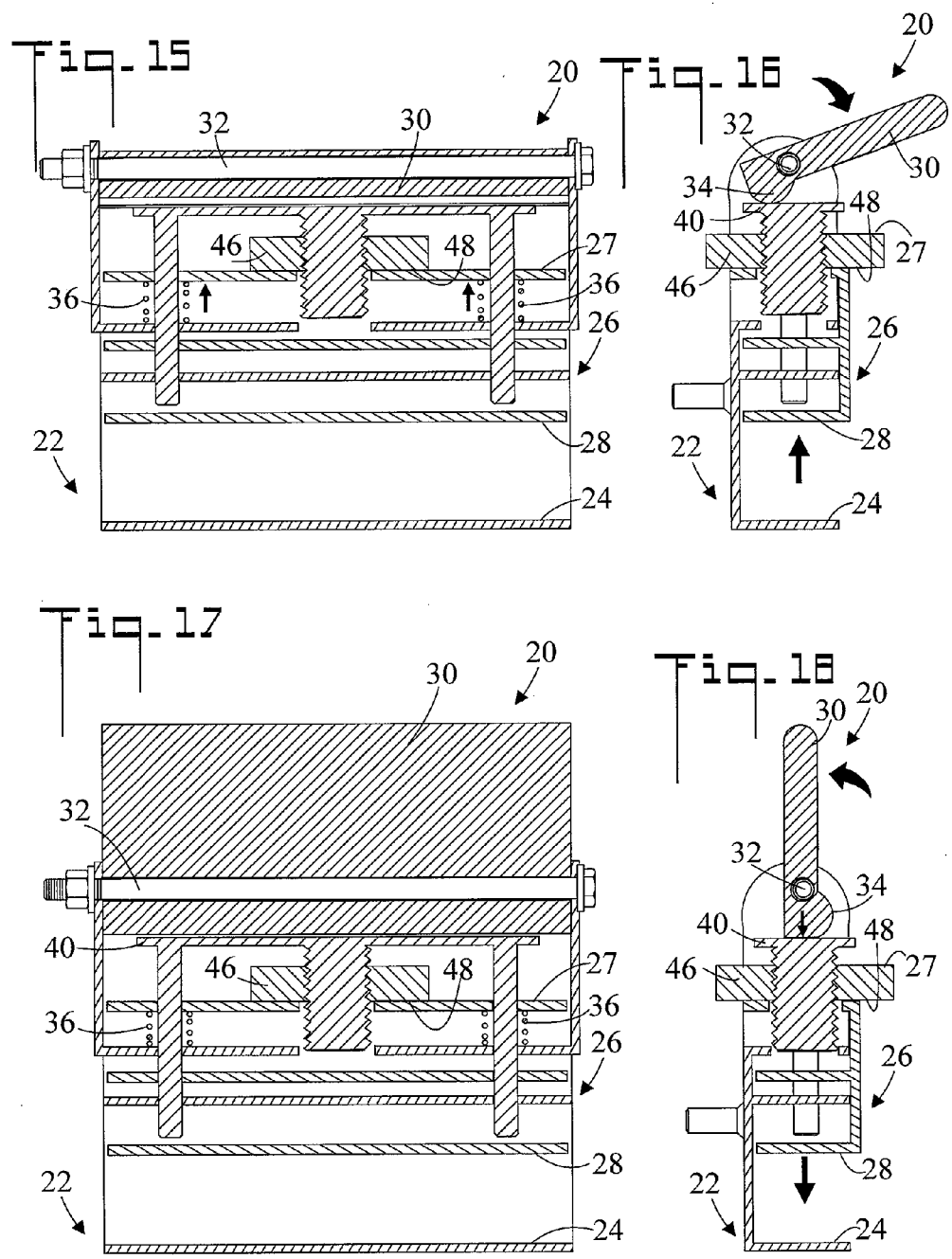

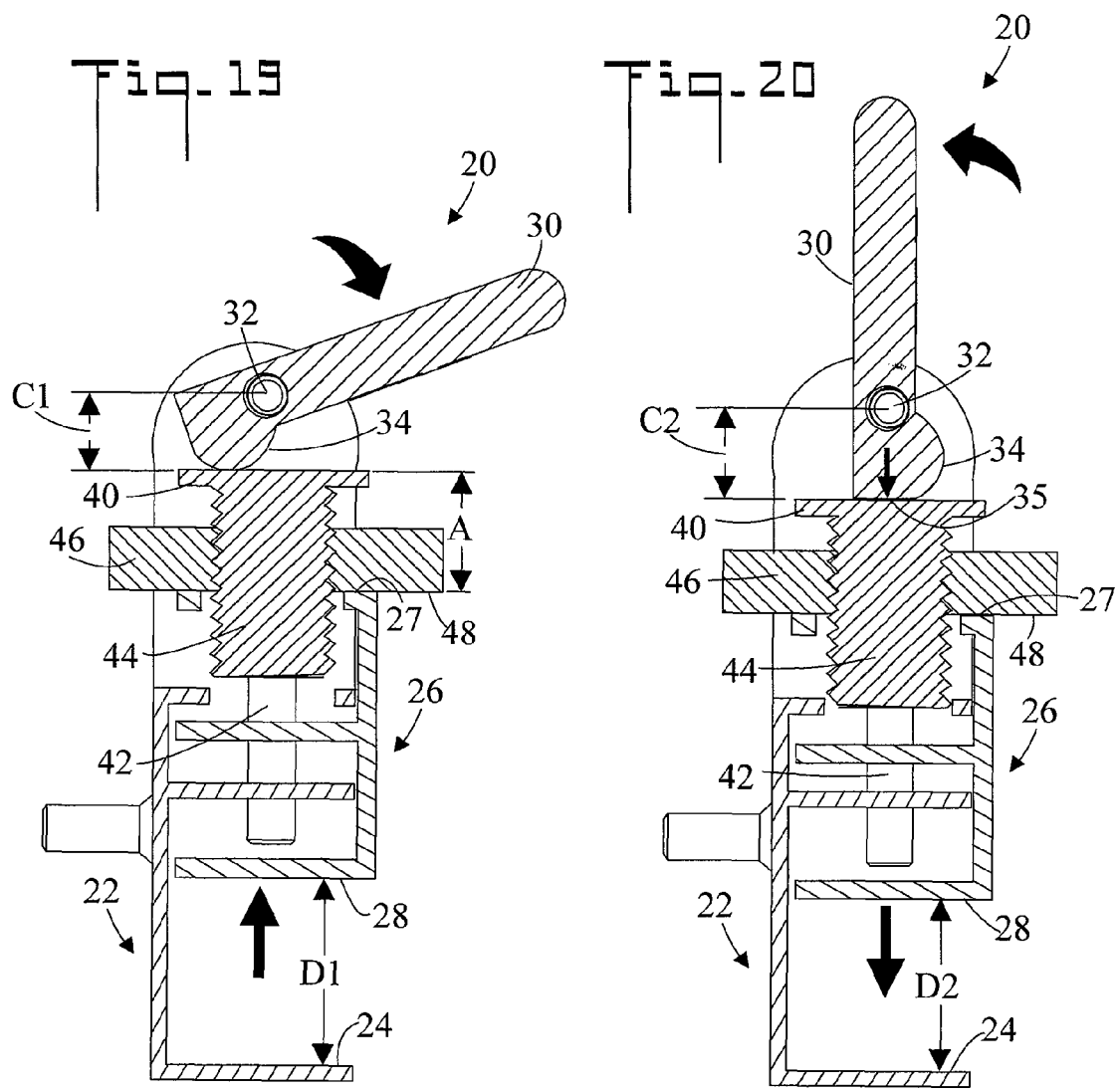
$$C2 - C1 = D1 - D2$$

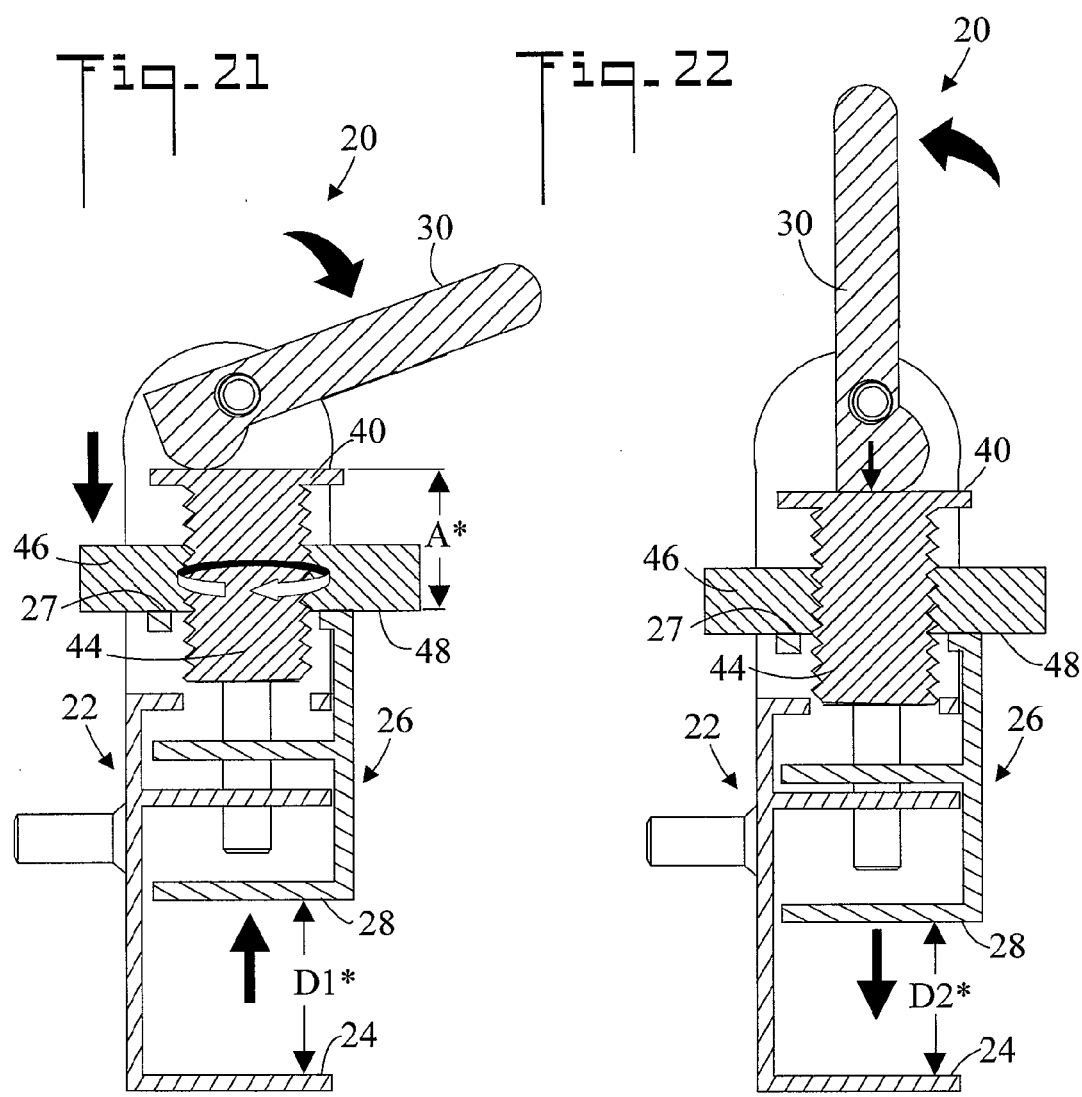

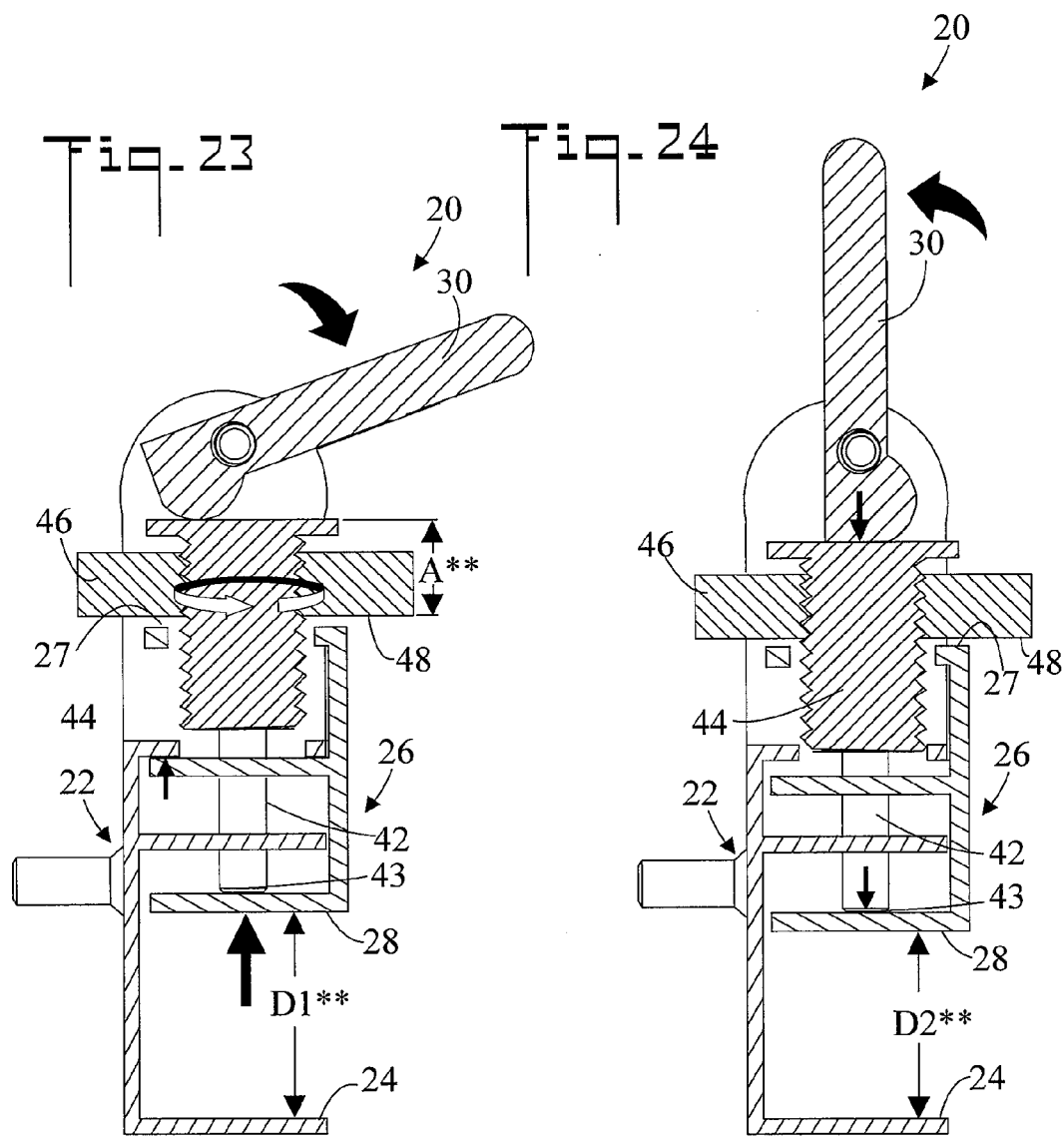

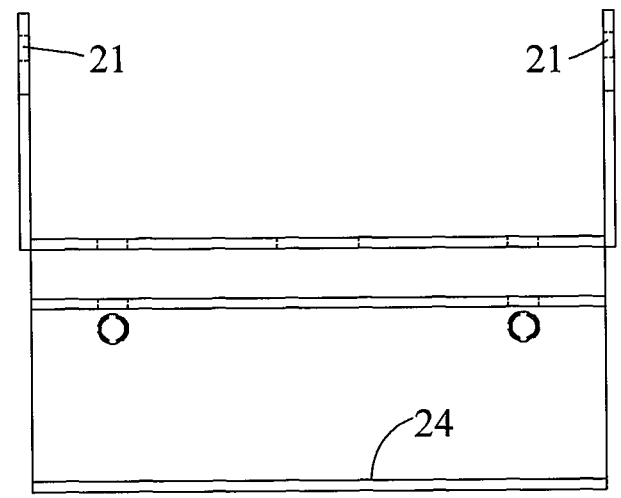
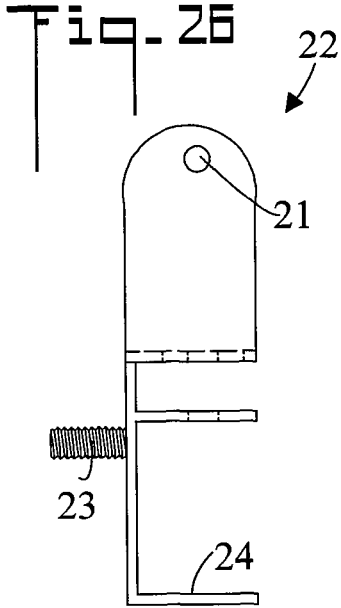
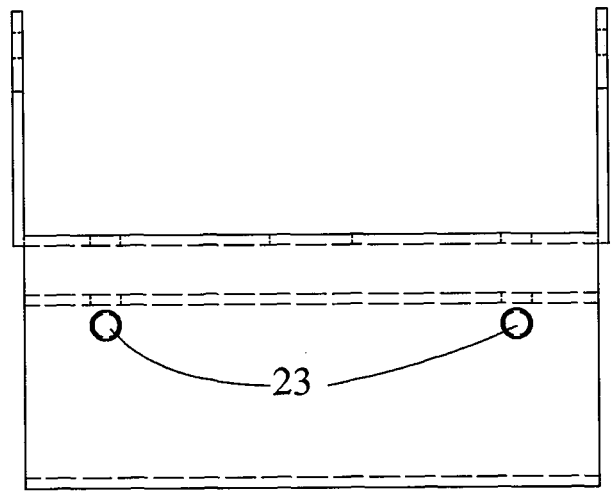

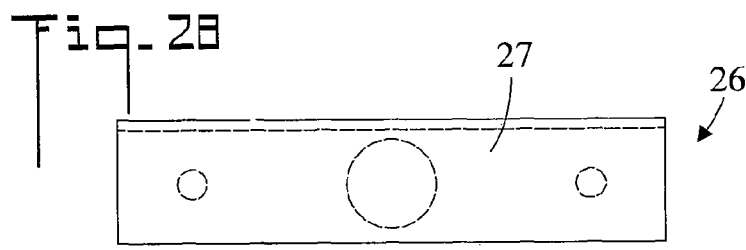
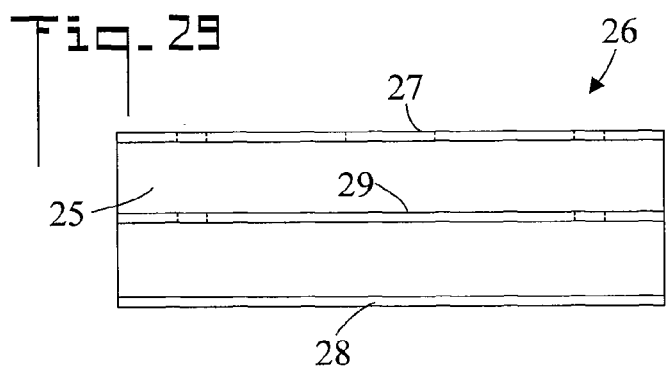
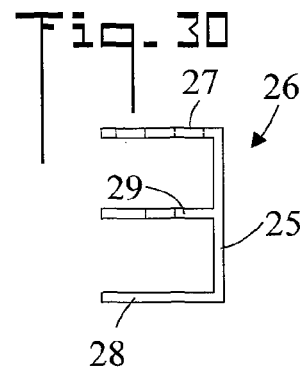
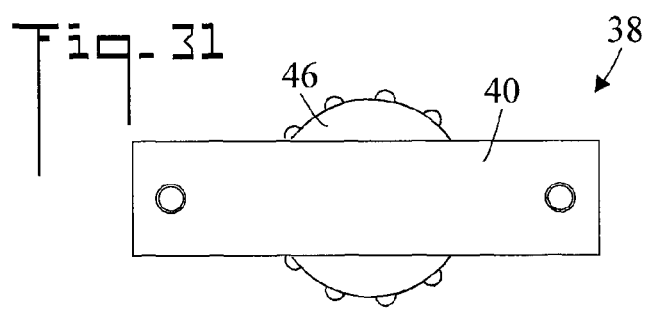
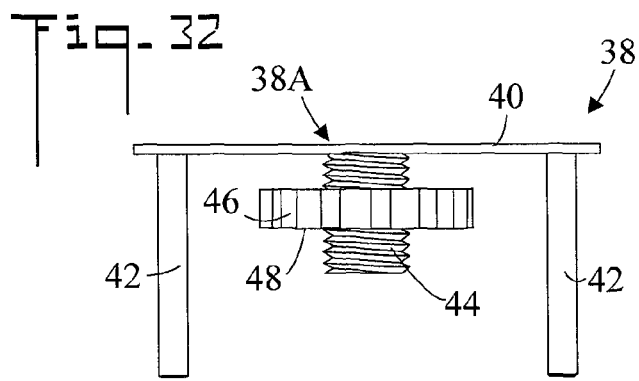
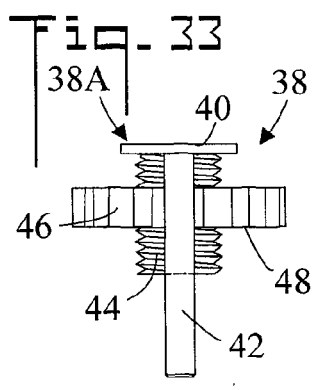

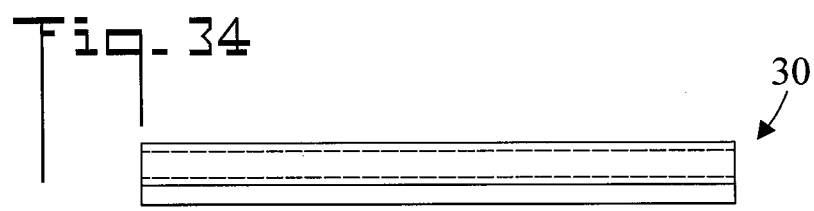
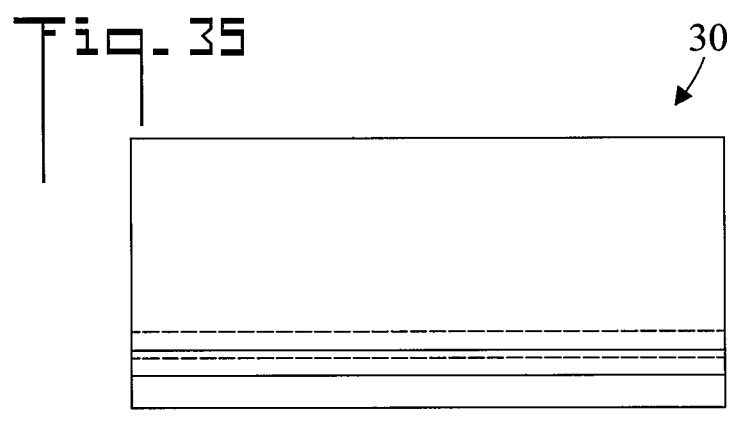
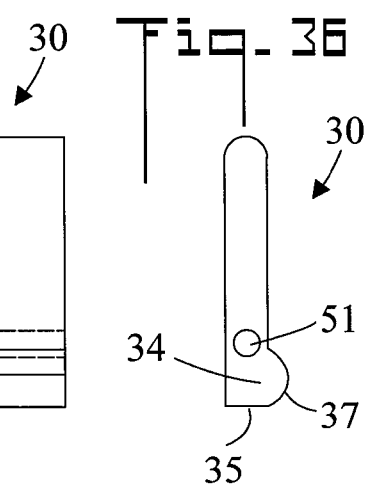
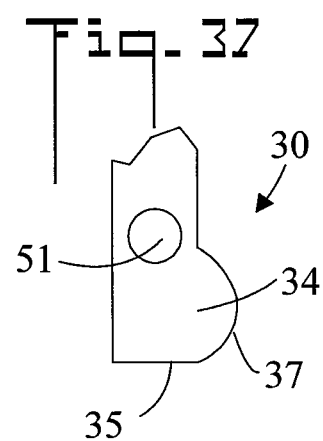

CLAMP AND METHOD OF USE

CROSS REFERENCE TO RELATED APPLICATION

This application claims the filing benefit under 35 U.S.C. § 119(e) of U.S. Provisional Application No. 61/940,530, filed Feb. 17, 2014, which is hereby incorporated by reference.

TECHNICAL FIELD

The present invention relates generally to clamps which are utilized to clamp a workpiece, and more particularly to a clamp which is opened and close by the rotation of a handle.

BACKGROUND OF THE INVENTION

Clamps are well know in the art. In one application, screen printing presses use a clamp system to hold their screens in register. It is common for press operators to continually release and reapply the clamps multiple times in order to achieve correct positioning of the screens. Because of the number of manipulations of the clamps required during press setup and operation, many screen printing press operators experience fatigue and minor injuries during setup. It would be desirable to have a device which clamps with minimal operator exertion. Further, single head screen printing presses are sometimes used with a combination of screens in order to achieve multicolor imprints. When changing between multiple screens, the user experiences production lag due to the excessive motion required to release and actuate the clamps. It would be desirable to have a device which actuates and releases quickly.

To that end, there currently exists a need in the industry for a device and associated method which quickly clamps and unclamps screens during registration and screen changing with minimal operator effort. Other inventions have attempted to solve the problem of speed, fatigue, and injury by employing a pneumatic clamping system. There are several drawbacks of such systems: 1) they require many expensive parts, including a compressor, 2) they take up excessive space, 3) they require electricity, and 4) they are unwieldy to use on a carousel press, a commonly used design for multicolor screen printing presses. Still other attempts to create a quick release clamp are executed by affixing a hand-tool lock clamp to a screen printing press. Problems caused by such use are 1) the angle of the actuating mechanisms for various hand-tool lock clamps is not suitable for ease of use with screen printing presses because they are ergonomically shaped to be used with a different orientation to the body than what is practical for affixing them to screen printing presses; 2) the release of hand-tool lock clamps is "all or nothing" and often jars the screen upon release, causing it to shift position, in turn further spoiling registration, 3) the grip of many lock clamps is designed for "all or nothing" clamping, making it difficult for screen registration when the operator desires a loose grip prior to full engagement, 4) lock clamps with variable pressure may not be easily fully engaged with a single action, and the pressure can not be loosened without fully disengaging, 5) the action of many lock clamps creates a non-perpendicular force during grip, causing the workpiece or screen to slip when being engaged. It would be desirable to have a clamp that allows for variable speed during engagement and disengagement, and that exerts perpendicular force. Accordingly, there remains a need in the art for a clamp system which uses perpendicular force, has a small footprint, is variably pressured and has variable speed when engaging and disengaging, and needs little or no extra support structure than what is currently present on screen printing presses.

BRIEF SUMMARY OF THE INVENTION

The present invention is directed to a quick actuating and quick release clamp for a screen printing press or other clamping applications. The clamp is operated by a rotating handle which has a cam. This allows the user to open and close the clamp using a variable speed and pressure. The screen is placed between the jaws of the clamp and the handle is rotated thereby clamping the screen between jaws at varying degrees of pressure according to the degree the handle is rotated. The clamp can be used as an attachment to a screen printing press to allow for quickly changing out screens with a single clamp action, without the need for screen re-registration.

In accordance with an embodiment, a clamp includes a fixed jaw assembly which has a fixed jaw, a movable jaw assembly which has a movable jaw, the movable jaw assembly movable with respect to the fixed jaw assembly so that the movable jaw moves with respect to the fixed jaw. A handle is rotatably connected to the fixed jaw assembly, the handle includes a cam which moves the movable jaw assembly. When the handle is placed in a first rotational position the movable jaw is disposed a first distance from the fixed jaw, and when the handle is placed in a second rotational position the movable jaw is disposed a second distance from the fixed jaw, the second distance being less than the first distance.

In accordance with another embodiment, at least one spring is disposed between the fixed jaw assembly and the movable jaw assembly, the spring urges the movable jaw away from the fixed jaw.

In accordance with another embodiment, a transfer assembly is disposed between the cam and the movable jaw assembly, the transfer assembly for transferring motion of the cam into motion of the movable jaw assembly. The transfer assembly includes a pressure member which is moved by the cam, at least one guide member, an adjustment screw, and an adjustment knob which threadably receives the adjustment screw. The adjustment knob has a surface which abuts the movable jaw assembly.

In accordance with another embodiment, the adjustment knob is threadably positionable along the adjustment screw. The position of the adjustment knob along the adjustment screw establishes the first and second distances by moving the movable jaw closer to or further away from the fixed jaw.

In accordance with another embodiment, the movable jaw assembly includes a base, a first flange disposed closest to the pressure member, and the movable jaw disposed furthest from the pressure member. The surface of the adjustment knob abuts the first flange.

In accordance with another embodiment, the first flange has a through hole which accepts the guide member.

In accordance with another embodiment, at least one spring is disposed between the fixed jaw assembly and the movable jaw assembly. The spring urges the movable jaw away from the fixed jaw. The spring is disposed between the first flange of the movable jaw assembly and the fixed jaw assembly.

In accordance with another embodiment, the cam has a flat portion which engages the pressure member when the handle is in the second rotational position.

In accordance with another embodiment, the guide member has a distal end. When the handle is placed in the first rotational position, and the adjustment knob is moved along the adjustment screw until the surface of the adjustment knob does not abut the first flange of the movable jaw assembly, the spring urges the movable jaw away from the fixed jaw until the movable jaw abuts the distal end of the guide member.

Other embodiments, in addition to the embodiments enumerated above, will become apparent from the following detailed description, taken in conjunction with the accompanying drawings, which illustrate, by way of example, the principles of the clamp and method of use.

BRIEF DESCRIPTION OF THE DRAWINGS

FIG. 4 is a perspective view of the clamp in an open position;

FIG. 5 is a perspective view of the clamp in a closed position;

FIG. 6 is a reduce exploded perspective view of the clamp;

FIG. 7 is top plan view of the clamp in an open position;

FIG. 8 is a front elevation view of the clamp in the open position;

FIG. 9 is a side elevation view of the clamp in the open position;

FIG. 10 is a bottom plan view of the clamp in the open position;

FIG. 11 is a rear elevation view of the clamp in the open position;

FIG. 12 is an opposite side elevation view of the clamp in the open position with a screen being placed between the jaws of the clamp;

FIG. 13 is a rear elevation view of the clamp in the closed position;

FIG. 14 is an opposite side elevation view of the clamp in the closed position with a screed clamped between the jaws of the clamp;

FIG. 15 is cross sectional view along the line 15-15 of FIG. 12;

FIG. 16 is a cross sectional view along the line 16-16 of FIG. 11;

FIG. 17 is cross sectional view along the line 17-17 of FIG. 14;

FIG. 18 is a cross sectional view along the line 18-18 of FIG. 13;

FIG. 19 is an enlarged cross sectional view as in FIG. 16;

FIG. 20 is an enlarged cross sectional view as in FIG. 18;

FIG. 21 is an enlarged cross sectional view showing the clamp in the open position with an adjustment knob placed in a different position from FIGS. 19 and 20;

FIG. 22 is an enlarged cross sectional view showing the clamp in the closed position with the adjustment knob placed in the different position from FIGS. 19 and 20;

FIG. 23 is an enlarged cross sectional view of the clamp in the open position without use of the adjustment screw;

FIG. 24 is an enlarged cross sectional view of the clamp in the closed position without use of the adjustment screw;

FIG. 25 is a front elevation view of a fixed jaw assembly;

FIG. 26 is an opposite side elevation view of the fixed jaw assembly;

FIG. 27 is a rear elevation view of the fixed jaw assembly;

FIG. 28 is a top plan view of a movable jaw assembly;

FIG. 29 is a rear elevation view of the movable jaw assembly;

FIG. 30 is a side elevation view of the movable jaw assembly;

FIG. 31 is a top plan view of a transfer assembly;

FIG. 32 is a front elevation view of the transfer assembly;

FIG. 33 is a side elevation view of the transfer assembly;

FIG. 34 is a top plan view of a handle;

FIG. 35 is a front elevation view of the handle;

FIG. 36 is a side elevation view of the handle; and,

FIG. 37 is an enlarged fragmented side elevation view of the handle showing a cam.

DETAILED DESCRIPTION OF THE INVENTION

Figure 1:
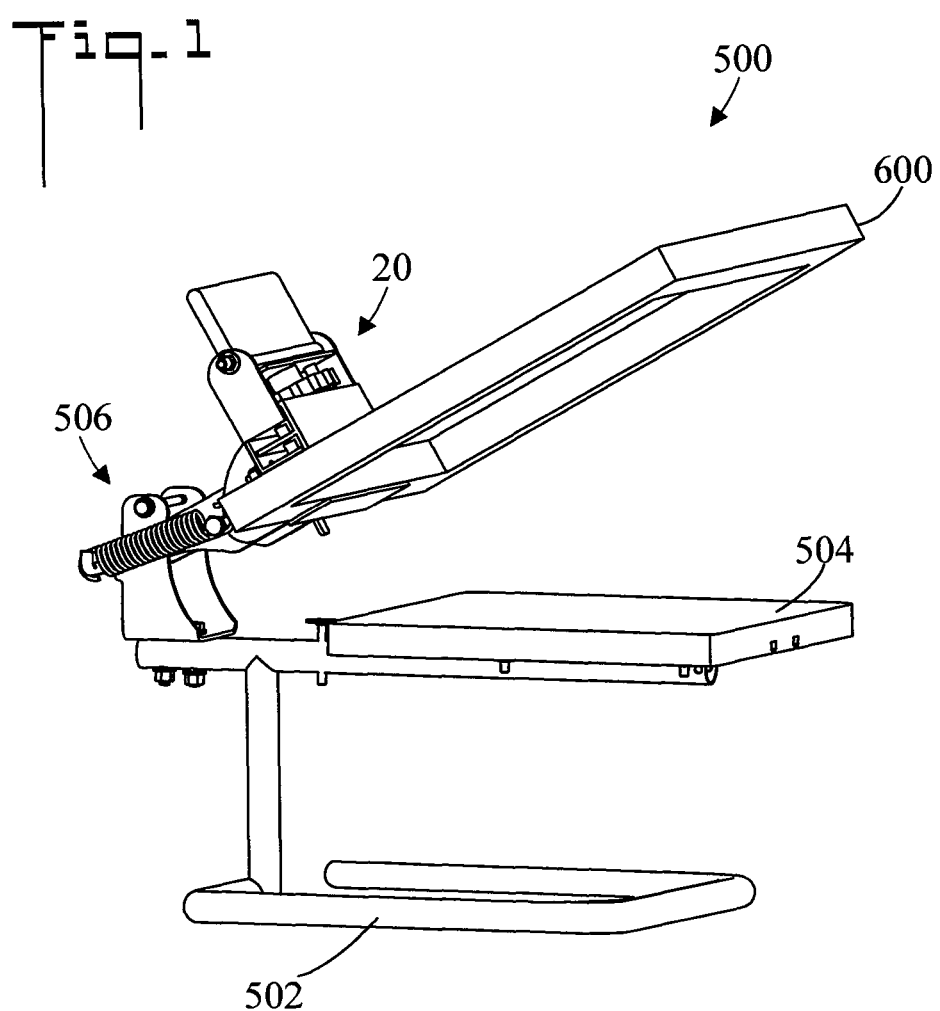
FIG. 1 is a reduced perspective view of a screen printing press having a clamp which holds a screen.
Figure 2:
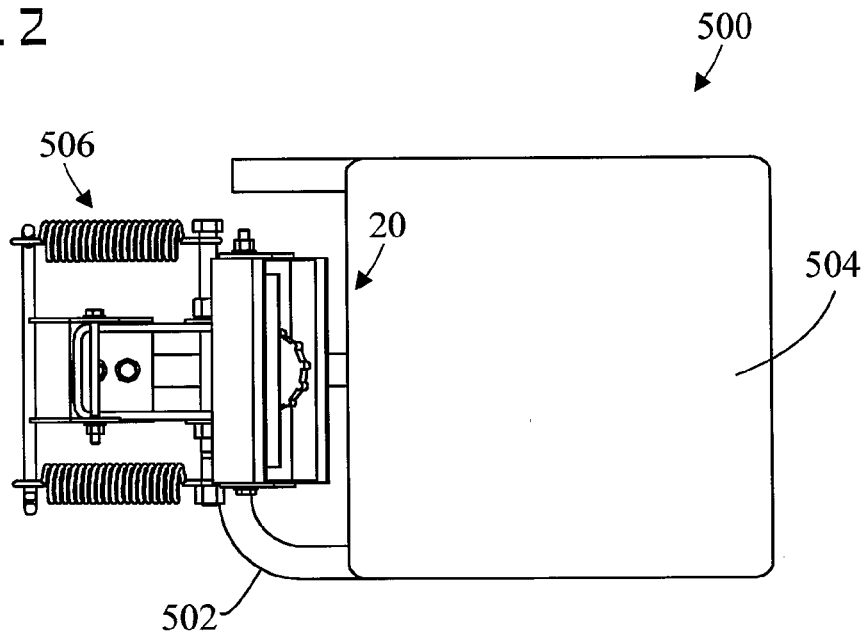
FIG. 2 is a reduced top plan view of the screen printing press without the screen.
Figure 3:
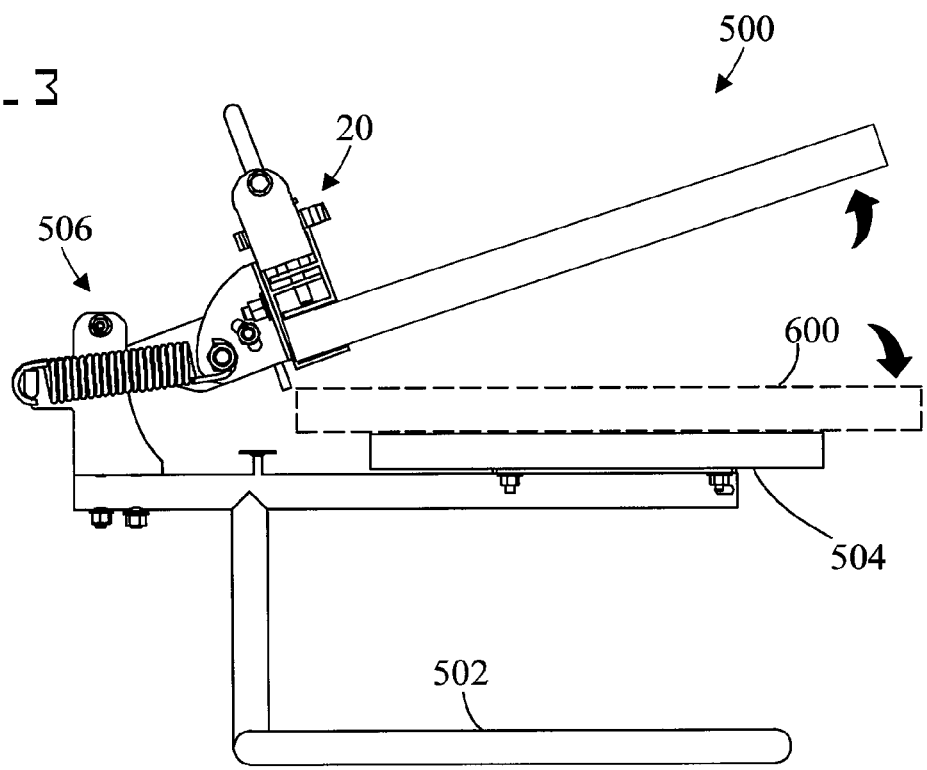
FIG. 3 is a reduced side elevation view of the screen printing press, the clamp, and the screen.

Referring initially to FIG. 1, there is illustrated a reduced perspective view of a screen printing press 500 having a clamp 20 which holds a screen 600. FIG. 2 is a reduced top plan view of screen printing press 500 without screen 600. And, FIG. 3 is a reduced side elevation view of screen printing press 500, clamp 20, and screen 600. As shown, screen printing press 500 includes a base 502, a platen 504 for supporting a substrate to be printed such as a tee-shirt (not shown), and clamp 20 for removably holding screen 600. Clamp 20 is pivotally connected to base 502 by a pivot mechanism 506, and can be placed in the raised position of FIGS. 1 and 3, or in a lowered ready-for-printing position wherein screen 600 is adjacent platen 504 (shown in dashed lines in FIG. 3). Clamp 20 is removably connectable to pivot mechanism 506.

FIGS. 4 and 5 are perspective views of clamp 20 in an open position and a closed position respectively, and FIG. 6 is a reduce exploded perspective view of clamp 20. Clamp 20 includes a fixed jaw assembly 22 (also refer to FIGS. 25-27) having a fixed jaw 24, and a movable jaw assembly 26 (also refer to FIGS. 28-30) having a movable jaw 28. Movable jaw assembly 26 is movable with respect to fixed jaw assembly 22 so that movable jaw 28 moves with respect to fixed jaw 24 (refer also to FIGS. 19 and 20 and the associated discussion). It is noted that in the shown embodiment, when clamp 20 is used fixed jaw 24 is disposed below movable jaw 28. However, it may be appreciated that clamp 20 can function at any desired orientation. As such any terms used herein like "up", "down", "above", "below", "upper", "lower", etc. would be appropriately modified in accordance with the orientation of clamp 20. A handle 30 is rotatably connected to fixed jaw assembly 22 by a bolt 32 and associated hardware which cooperate with a hole 51 in handle 30 (also refer to FIGS. 34-37). Handle 30 includes a cam 34 which moves movable jaw assembly 26 (refer to FIGS. 19 and 20 and the associated discussions). When handle 30 is placed in a first rotational position (down in the shown embodiment, refer also to FIG. 19) movable jaw 28 is disposed a first distance D1 from fixed jaw 24. Conversely, when handle 30 is placed in a second rotational position (up in the shown embodiment, refer to FIG. 20) movable jaw 28 is disposed a second distance D2 from fixed jaw 24, second distance D2 being less than first distance D1. That is, when handle 30 is placed in the first rotational position jaws 24 and 28 are open and ready to accept a screen 600, and when handle 30 is place in the second rotational position jaws 24 and 28 are closed and clamp around the screen 600 (refer also to FIGS. 12 and 14). It is noted that the first and second rotational positions of handle 30 are approximately 90° apart.

Clamp 20 further includes at least one compression spring 36 (two in the shown embodiment) which are disposed between fixed jaw assembly 22 and movable jaw assembly 26. Spring 36 urges movable jaw 28 away from fixed jaw 24 (refer to FIG. 11 and the associated discussion).

Clamp 20 further includes a transfer assembly 38 (also refer to FIGS. 31-33) which is disposed between cam 34 and movable jaw assembly 26. Transfer assembly 38 transfers the motion of cam 34 into motion of movable jaw assembly 26 and therefore movable jaw 28 (refer also to FIGS. 19 and 20 and the associated discussions). Transfer assembly 38 includes a distal end 38A with a pressure member 40 which is moved by cam 34 (refer to FIGS. 19, 20, 32, and 33), at least one guide member 42 (two in the shown embodiment), an adjustment screw 44, and an adjustment knob 46 which threadably receives adjustment screw 44. In the shown embodiment pressure member 40 is a plate, and guide member 42 is a circular rod. Adjustment knob 46 has a surface 48 which abuts movable jaw assembly 26. In the shown embodiment, surface 48 is the bottom surface of adjustment knob 46 which abuts the top surface of a first flange 27 of movable jaw assembly 26 (refer also to FIGS. 19 and 20). In an embodiment, a pad can be installed on pressure member 40 so that cam 34 presses upon the pad. In FIG. 6 it is noted that fixed jaw assembly 22 has a first end 22A and an opposite second end 22B, fixed jaw 24 is disposed at first end 22A of fixed jaw assembly 22. It is also noted that handle 30 is rotatably connected to second end 26B of fixed jaw assembly 22, and that fixed jaw assembly 22 has a flange 60 which has at least one through hole 62 which is configured to receive the at least one guide member 42. It is further noted that movable jaw assembly 26 has a first end 26A and an opposite second end 26B, movable jaw 28 is disposed at first end 26A of movable jaw assembly 26.

FIG. 7-12 are top plan, front elevation, side elevation, bottom plan, rear elevation, and opposite side elevation views respectively of clamp 20 in an open position ready to receive a screen 600. As is indicated in FIG. 12, handle 30 has been placed down in the first rotational position to open jaws 24 and 28. FIG. 12 shows a screen 600 being placed (inserted) between fixed jaw 24 and movable jaw 28 of clamp 20. It is noted that fixed jaw 24 and movable jaw 28 are planar so that they evenly clamp screen 600 therebetween. Shown in the FIGs. are fixed jaw assembly 22, fixed jaw 24, movable jaw assembly 26, movable jaw 28, handle 30, bolt 32, spring 36, transfer assembly 38, pressure member 40, guide members 42, adjustment screw 44, and adjustment knob 46 having surface 48. Referring to FIG. 11, compression spring 36 is disposed between fixed jaw assembly 22 and a first flange 27 of movable jaw assembly 26 (refer also to FIGS. 6, and 28-30). As such, spring 36 urges movable jaw 28 away from fixed jaw 24 as is shown by the arrow in FIG. 12. In the shown embodiment, movable jaw assembly 26 is urged upward in the direction of the arrows of FIG. 11. That is, spring 36 causes movable jaw 28 and fixed jaw 24 to be moved apart (opened). It is further noted that in the shown embodiment spring 36 surrounds guide members 42. In an embodiment a pad can be disposed on one or both of fixed jaw 24 and movable jaw 28 to prevent marring of screen 600 or other workpiece. A pad can also have another use. Referring to FIG. 9, in an embodiment a pad P (shown in dashed lines) is installed on the top of fixed jaw 24. Pad P ensures that screen 600 can be fully inserted (seated) between jaws 24 and 28 and abut the back 90 of the jaws. Pad P is useful in instances where the radius of curvature R of the junction of fixed jaw 24 and back 90 is greater than the radius of curvature of the edge of screen 600. In these instances, because of the radius of curvature R, screen 600 cannot be properly seated so that it abuts back 90. Installing pad P eliminates this problem by effectively raising the surface of fixed jaw 24 so that screen 600 can directly abut back 90 without encountering the radius of curvature R.

FIGS. 13 and 14 are rear elevation and opposite side elevation views respectively of clamp 20 in the closed position with a screen 600 clamped between fixed jaw 24 and movable jaw 28. Handle 30 has been placed up in the second rotational position to close jaws 24 and 28, and screen 600 is clamped between the two jaws. The arrow in FIG. 14 indicates the downward movement of movable jaw which effects the clamping action. It is noted that in FIGS. 12 and 13 the movement of movable jaw 28 is perpendicular to fixed jaw 24. This feature prevents any slipping of screen 600.

FIG. 15 is a cross sectional view along the line 15-15 of FIG. 12, FIG. 16 is a cross sectional view along the line 16-16 of FIG. 11, FIG. 17 is cross sectional view along the line 17-17 of FIG. 14, FIG. 18 is a cross sectional view along the line 18-18 of FIG. 13, FIG. 19 is an enlarged cross sectional view as in FIG. 16, and FIG. 20 is an enlarged cross sectional view as in FIG. 18. These FIGs. show the clamping action of clamp 20. First it is noted that movable jaw assembly 26 includes a base 25, a first flange 27 which is disposed closest to pressure member 40, and movable jaw 28 disposed furthest from pressure member 40 (refer also to FIGS. 6, and 28-30). Movable jaw assembly 26 has the general shape of an "E", with first flange 27 and movable jaw 28 perpendicularly extending from base 25 and forming the top and bottom segments of the "E". As was previously pointed out, surface 48 of adjustment knob 46 abuts first flange 27 of movable jaw assembly 26. It is noted that at least one spring 36 is disposed in its entirety between handle 30 and both movable jaw 28 and fixed jaw 24. That is, the positional order of these components is handle 30, at least one spring 36, movable jaw 28, and fixed jaw 24. It is also noted that adjustment knob 46 is disposed in its entirety between handle 30 and both movable jaw 28 and fixed jaw 24. That is, the positional order of these components is handle 30, adjustment knob 46, movable jaw 28, and fixed jaw 24.

Clamp 20 is in the open position in FIGS. 15, 16, and 19. Handle 30 has been placed in the first rotational position by rotating it down as is shown in FIGS. 16 and 19. Spring 36 urges first flange 27 of movable jaw assembly 26 up, thereby moving movable jaw 28 up and away from fixed jaw 24. In this open position of clamp 20, a screen 600 can be placed between the open jaws (refer to FIG. 12).

Clamp 20 is in the closed position in FIGS. 17, 18, and 20. Handle 30 has been placed in the second rotational position by rotating it up as is shown in FIGS. 18 and 20. In the shown embodiment, the rotation causes cam 34 to move pressure member 40 down as is indicated by the arrows in FIGS. 18 and 20. This moves the entire transfer assembly 38 including adjustment knob 46 down. Since the surface 48 of adjustment knob 46 abuts first flange 27 of movable jaw assembly 26, the entire movable jaw assembly 26 is also moved down thereby moving movable jaw 28 closer to fixed jaw 24. This clamps screen 600 between the two jaws (refer to FIG. 14). One purpose of the transfer assembly 38 is to simply transfer the turning motion of cam 34 into an opening and closing of jaws 24 and 28. The reason that is important, is to make clamp 20 slip less on the screen 600 during the clamping action. Since clamp 20 is being used for registering images to one another in between clamping actions, it is critical that screen 600 not move during the clamping action.

Referring to FIGS. 19 and 20, as was previously stated, when handle 30 is placed in the first open rotational position of FIG. 19 (down in the shown embodiment), movable jaw 28 is disposed a first distance D1 from fixed jaw 24. Conversely, when handle 30 is placed in a second closed rotational position of FIG. 20 (up in the shown embodiment) movable jaw 28 is disposed a second distance D2 from fixed jaw 24, second distance D2 being less than first distance D1. It is further noted that the distance which cam 34 moves transfer assembly 38 is defined as the difference between the distance C1 between bolt 32 (the rotational axis of cam 34) and pressure member 40 in the first rotational position of handle 30 as shown in FIG. 19, and the distance C2 between bolt 32 and pressure member 40 in the second rotational position of handle 30 as shown in FIG. 20. This distance difference C2-C1 is the same as the distance difference D1-D2 of the jaws, as is depicted in FIG. 20. It is also noted in FIGS. 19 and 20 that the surface 48 of adjustment knob 46 is a distance A from the top surface of pressure member 40. It is also noted that because clamp 20 is operated by the rotation of handle 30, this allows the user to control the speed at which the jaws of clamp 20 close around screen 600, and also therefore the amount of pressure which is applied to screen 600.

FIGS. 21 and 22 are enlarged cross sectional views showing clamp 20 in open and closed positions respectively with adjustment knob 46 placed in a different position from FIGS. 19 and 20. These FIGs. show an adjustment feature of clamp 20. Adjustment knob 46 is threadably positionable along adjustment screw 44. As shown adjustment knob 46 has been turned clockwise so that it moves down along adjustment screw 44. The surface 48 of adjustment knob 46 abuts first flange 27 of movable jaw assembly 26 and now resides a distance A* from the surface of pressure member 40, where A* is greater than distance A of FIGS. 19 and 20. The position of adjustment knob 46 along adjustment screw 44 establishes the first D1 and second D2 distances by moving movable jaw assembly 26 (and movable jaw 28) closer to or further away from fixed jaw 24. In FIG. 19 in the open position of clamp 20 with handle 30 in the first position, the distance between fixed jaw 24 and movable jaw 28 was D1. However, in FIG. 21 because adjustment knob 46 has been moved down, it has forced movable jaw assembly 26 down thereby closing the jaws. That is, distance D1* in FIG. 21 is less than distance D1 in FIG. 19. Similarly, in FIG. 22, when handle 30 is placed in the second rotational position closing jaws 24 and 28, the second (closed) distance D2* between the jaws is less than the distance D2 of FIG. 20. That is, the jaws have been closed with respect to FIGS. 19 and 20. The movement of adjustment knob 46 along adjustment screw 44 thereby adjusts both the open D1 and closed D2 distances between the jaws. It may be appreciated that moving adjustment knob 46 in the opposite upward direction would open the jaws. This adjustment feature is useful in accommodating screens 600 of different thickness T (refer to FIG. 14).

FIGS. 23 and 24 are enlarged cross sectional views of clamp 20 in the open and closed positions respectively without use of the adjustment screw 46. This mode of operation of clamp 20 is useful in instances where the thickness T of screen 600 has a tight tolerance thereby making an adjustment unnecessary. In this configuration adjustable knob 46 has been rotated up counterclockwise along adjustment screw 44 until surface 48 no longer abuts first flange 27 of movable jaw assembly 26. That is, adjustment knob 46 has been taken out of play. As such, when handle 30 is moved to the closed second rotational position of FIG. 24, surface 48 no longer causes movable jaw 26 to move. In this mode, what does cause movable jaw 26 to move is guide member 42. Guide member 42 has a distal end 43. In FIG. 23, when handle 30 is placed in the first rotational position, and adjustment knob 46 is moved along adjustment screw 44 until surface 48 of adjustment knob 46 does not abut first flange 27 of movable jaw assembly 26, springs 36 (refer to FIGS. 11, 13, 15, and 17) urge movable jaw 28 away from fixed jaw 24 until movable jaw 28 abuts distal end 43 of guide member 42. There then exists a distance D1 between movable jaw 28 and fixed jaw 24. Then in FIG. 24 when handle 30 is placed in the second rotational position, the distal end 43 of guide member 42 moves movable jaw 28 down toward fixed jaw 24. There then exists a distance D2 where D2 is less than D1.

FIGS. 25-27 are front elevation, opposite side elevation, and rear elevation views respectively of fixed jaw assembly 22. It is noted that fixed jaw assembly 22 includes two mounting studs 23 (which are threaded in the shown embodiment of FIG. 26), and which outwardly project from the rear of fixed jaw assembly. Mounting studs 23 are used to connect clamp 20 to pivot mechanism 506 (refer to FIGS. 1-3). Also, fixed jaw assembly 22 has two holes 21 which receive bolt 32 (refer also to FIG. 6).

FIGS. 28-30 are top plan, rear elevation, and side elevation views respectively of movable jaw assembly 26. Shown are base 25, first flange 27, and movable jaw 28. Movable jaw assembly 26 also has a middle flange 29. First flange 27 and middle flange 29 each have through holes 31 which accept guide member 42 (refer to FIGS. 6 and 12). It is noted that first flange 27 and middle flange 29 are both disposed parallel to movable jaw 28. In FIG. 30 it is also noted that when viewed from the side movable jaw assembly 26 has the shape of a backward E.

FIGS. 31-33 are top plan, front elevation, and side elevation views respectively of transfer assembly 38. Shown are pressure member 40, guide member 42, adjustment screw 44, and adjustment knob 46 having surface 48. It is noted that transfer assembly 38 has a distal end 38A which is moved by cam 30 (refer to FIG. 6). Both adjustment screw 44 and at least one guide member 42 are connected to distal end 38A.

FIGS. 34-36 are top plan, front elevation, and side elevation views respectively of handle 30, and FIG. 37 is an enlarged fragmented side elevation view of the handle 30 showing cam 34. Handle 30 has a through hole 51 which receives bolt 32 (refer also to FIG. 6). Bolt 32 forms the axis about which cam 34 rotates. Cam 34 includes a curved portion 37 which cooperates with pressure member 40 to move transfer assembly 38 (refer to FIGS. 16 and 18). Cam 34 also includes a flat portion 35 which engages pressure member 40 when handle 30 is in the second upright rotational position (also refer to FIG. 20). Flat portion 35 serves as a detent which tends to lock handle 30 in the upright position.

The various components of clamp 20 can be fabricated from aluminum or other suitable metal.

In another embodiment, clamp 20 can be combined with screen printing press 500 to form a clamping system.

It may be appreciated that while the previous discussion focuses upon the use of clamp 20 in a screen printing press, clamp 20 could also be used in other clamping applications for other workpieces where a quick clamping and unclamping action is desired.

In terms of use, a method for clamping the screen 600 of a screen printing press 500 includes (refer to FIGS. 1-37:

(a) providing a screen 600;

(b) providing a screen printing press 500 having a clamp 20, the clamp 20 including;

a fixed jaw assembly 22 having a fixed jaw 24;

a movable jaw assembly 26 having a movable jaw 28, the movable jaw assembly 26 movable with respect to the fixed jaw assembly 22 so that the movable jaw 28 moves with respect to the fixed jaw 24 and can clamp the screen 600 between the fixed jaw 24 and the movable jaw 28;

a handle 30 rotatably connected to the fixed jaw assembly 22, the handle 30 including a cam 34 which moves the movable jaw assembly 26;

when the handle 30 is placed in a first rotational position the movable jaw 28 is disposed a first distance D1 from the fixed jaw 24, and when the handle 30 is placed in a second rotational position the movable jaw 28 is disposed a second distance D2 from the fixed jaw 24, the second distance D2 being less than the first distance D1;

(c) placing the handle 30 in the first rotational position;

(d) placing the screen 600 between the fixed jaw 24 and the movable jaw 28; and, (e) placing the handle 30 in the second rotational position causing the movable jaw 28 to move toward the fixed jaw 22 and clamp the screen 600 between the fixed jaw 24 and the movable jaw 28.

The method further including:

in (b), a transfer assembly 38 disposed between the cam 34 and the movable jaw assembly 26, the transfer assembly 38 for transferring motion of the cam 34 into motion of the movable jaw assembly 26, the transfer assembly 38 including a pressure member 40 which is moved by the cam 34, at least one guide member 42, an adjustment screw 44; an adjustment knob 46 which threadably receives the adjustment screw 44, and the adjustment knob 46 having a surface 48 which abuts the movable jaw assembly 26;

in (b), the adjustment knob 46 threadably positionable along the adjustment screw 44;

in (b), the position of the adjustment knob 46 along the adjustment screw 44 establishing the first D1 and second D2 distances by moving the movable jaw 28 closer to or further away from the fixed jaw 24; and, before (e), turning the adjustment knob 46 to achieve a desired second distance D2.

The method further including:

in (b), a transfer assembly 38 disposed between the cam 34 and the movable jaw assembly 26, the transfer assembly 38 for transferring motion of the cam 34 into motion of the movable jaw assembly 26, the transfer assembly 38 including a pressure member 40 which is moved by the cam 34, and at least one guide member 42, the guide member 42 having a distal end 43, and when the handle 30 is placed in the second position, the distal end 43 of the guide member 42 engaging the movable jaw 28 and causes the movable jaw 28 to move toward the fixed jaw 24; and, before (e), turning the adjustment knob 46 until the surface of adjustment knob 46 does not abut the first flange 27 of the movable jaw assembly: 26 and, in (e), the distal end 43 of the guide member 42 engaging the movable jaw 28 and causing the movable jaw 28 to move toward the fixed jaw 24.

The embodiments of the clamp and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the clamp and method should be construed as limiting the invention to a particular embodiment or combination of embodiments. The scope of the invention is defined by the appended claims.

I claim:

1. A clamp, comprising:

a fixed jaw assembly having a first end and an opposite second end, a fixed jaw is disposed at said first end of said fixed jaw assembly;

a movable jaw assembly having a first end and an opposite second end, a movable jaw is disposed at said first end of said movable jaw assembly, said movable jaw assembly movable with respect to said fixed jaw assembly so that said movable jaw moves with respect to said fixed jaw;

a handle is rotatably connected to said second end of said fixed jaw assembly, said handle including a cam which moves said movable jaw assembly;

said handle is positionable to a first rotational position wherein said movable jaw is disposed a first distance from said fixed jaw, and said handle is positionable to a second rotational position wherein said movable jaw is disposed a second distance from said fixed jaw, said second distance being less than said first distance;

at least one spring which is configured to urge said movable jaw away from said fixed jaw;

said at least one spring is disposed between said handle and both said movable jaw and said fixed jaw;

an adjustment screw; and, an adjustment knob which threadably receives said adjustment screw, said adjustment knob is threadably positionable along said adjustment screw to abut and move said movable jaw assembly, and said adjustment knob is disposed between said handle and both said movable jaw and said fixed jaw.

2. The clamp according to claim 1, further including:

a first flange is disposed at said second end of said movable jaw assembly; and said adjustment knob is positionable to abut and move said first flange toward said fixed jaw.

3. The clamp according to claim 1, further including:

a transfer assembly disposed between said cam and said movable jaw assembly, said transfer assembly configured to transfer motion of said cam into motion of said movable jaw assembly;

said transfer assembly having a distal end which is moved by said cam; and, said transfer assembly including (1) said adjustment screw, and (2) at least one guide member, both of which are connected to said distal end.

4. The claim according to claim 3, further including:

said fixed jaw assembly having a flange, said flange having at least one through hole which is configured to receive said at least one guide member; and, a first flange is disposed at said second end of said movable jaw assembly, said first flange having at least one through hole which is configured to accept said at least one guide member.

5. The clamp according to claim 1, further including:
said position of said adjustment knob along said adjustment screw establishing said first and second distances.

6. The clamp according to claim 1, further including:
said moveable jaw assembly having a first flange and a middle flange; and,
said first flange and said middle flange are both disposed parallel to said movable jaw.

7. The clamp according to claim 6, further including:
when viewed from the side said movable jaw assembly having the shape of a backward E.

8. The clamp according to claim 1, further including:
said movable jaw assembly having a first flange;
at least one spring which is configured to urge said movable jaw away from said fixed jaw;
a transfer assembly disposed between said cam and said movable jaw assembly, said transfer assembly configured to transfer motion of said cam into motion of said movable jaw assembly;

said transfer assembly having a distal end which is moved by said cam, at least one guide member connected to said distal end, an adjustment screw connected to said distal end;

said at least one guide member having a distal end;

said handle is positionable to said first rotational position and said adjustment knob is positionable along said adjustment screw until said adjustment knob does not abut said first flange of said movable jaw assembly, wherein said spring urges said movable jaw away from said fixed jaw until said movable jaw abuts said distal end of said at least one guide member; and, said handle is positionable to said second rotational position wherein said distal end of said at least one guide member moves said movable jaw toward said fixed jaw.

\* \* \* \* \*